US007788409B2

(12) United States Patent
Doumuki et al.

(10) Patent No.: US 7,788,409 B2
(45) Date of Patent: Aug. 31, 2010

(54) SYSTEM AND METHOD FOR ACHIEVING INTEROPERABILITY IN HOME NETWORK WITH IEEE 1394 AND UPNP DEVICES

(75) Inventors: Tohru Doumuki, San Diego, CA (US); Dipendu Saha, San Diego, CA (US); David Tao, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1218 days.

(21) Appl. No.: 11/365,414

(22) Filed: Mar. 1, 2006

(65) Prior Publication Data

US 2007/0101024 A1 May 3, 2007

Related U.S. Application Data

(60) Provisional application No. 60/731,366, filed on Oct. 28, 2005.

(51) Int. Cl.
*G06F 15/16* (2006.01)
(52) U.S. Cl. .................. 709/246; 709/217; 709/218; 709/219; 709/220; 370/467; 370/401; 370/254
(58) Field of Classification Search .......... 709/208, 709/216–219, 249, 246, 203, 230, 228, 220, 709/227; 370/401, 466, 236, 395, 229, 467, 370/254, 468, 474
See application file for complete search history.

(56) References Cited

U.S. PATENT DOCUMENTS

| 6,237,049 | B1 * | 5/2001 | Ludtke .......................... 710/8 |
| 6,542,506 | B1 * | 4/2003 | Lee ........................ 370/395.31 |
| 6,618,764 | B1 | 9/2003 | Shteyn ....................... 709/249 |
| 2003/0110334 | A1 | 6/2003 | Lanigan et al. ................. 710/72 |
| 2003/0177270 | A1 * | 9/2003 | Noda et al. ................... 709/246 |
| 2004/0098531 | A1 * | 5/2004 | Hagg et al. ................... 710/315 |
| 2004/0246992 | A1 * | 12/2004 | Henry et al. ................. 370/467 |
| 2005/0002402 | A1 * | 1/2005 | Fairman .................. 370/395.5 |
| 2005/0018696 | A1 | 1/2005 | Henry et al. ................. 370/401 |
| 2005/0021852 | A1 | 1/2005 | Accarie et al. .............. 709/245 |
| 2005/0066024 | A1 | 3/2005 | Crocitti et al. .............. 709/223 |
| 2005/0078679 | A1 | 4/2005 | Henry et al. ............... 370/395.2 |
| 2005/0169287 | A1 | 8/2005 | Krusche et al. ............. 370/401 |
| 2005/0216949 | A1 | 9/2005 | Candelora et al. ........... 725/134 |
| 2006/0218180 | A1 * | 9/2006 | Bodlaender et al. ..... 707/103 R |

* cited by examiner

*Primary Examiner*—Wing F Chan
*Assistant Examiner*—Benjamin M Thieu
(74) *Attorney, Agent, or Firm*—John L. Rogitz

(57) ABSTRACT

In a home network, a proxy is used to convert information in UPnP format from UPnP devices to IEEE 1394 format so that IEEE 1394 devices in the network can access the information which was originally in UPnP format. Likewise, the proxy converts information in IEEE 1394 format from IEEE 1394 devices to UPnP format so that UPnP devices in the network can access the information which was originally in IEEE 1394 format.

13 Claims, 17 Drawing Sheets

SYSTEM AND METHOD FOR ACHIEVING INTEROPERABILITY IN HOME NETWORK WITH IEEE 1394 AND UPNP DEVICES

RELATED APPLICATION

This application claims priority from U.S. provisional application Ser. No. 60/731,366 filed Oct. 28, 2005.

FIELD OF THE INVENTION

The present invention relates generally to home entertainment systems.

BACKGROUND OF THE INVENTION

A variety of technologies exist for networking consumer electronics (CE) devices in home networks. These technologies enable one device on a network to control other devices remotely for content retrieval. So that devices can communicate, they must use a common communication protocol, i.e., the same message and data format and procedures must be used between devices for the devices to be able to exchange data.

Two network protocols have become widely used, namely, IEEE 1394, also referred to as "i.LINK", and IP-based networks using universal plug-and-play (UPnP) protocols. IEEE 1394 has been adapted to many digital audio/video (A/V) products such as digital TV (DTV), video cassette recorders (VCR), hard disc recorders (HDR), set-top boxes (STB), etc. On the other hand, IP-based protocols, which are more PC-oriented, are expected to be increasingly adopted by CE devices, particularly in light of the direction of the Digital Living Network Alliance (DLNA).

The present invention recognizes that these two network technologies are not interoperable, that is, a IEEE 1394 device cannot communicate directly with a UPnP device. Accordingly, a user may not be able to use a newly purchased UPnP-enabled media server, for example, with an existing IEEE 1394 DTV, complicating updating a home network system.

The present invention further recognizes that one solution to this issue is to use the so-called "RemoteUI" protocol on the UPnP architecture, which enables one UPnP device to exchange information on a user interface (UI) with another UPnP device as well as a user's input. Another approach is to use IP-over-1394 protocol, which enables IP-based communication on IEEE 1394 networks. In these approaches, however, the IEEE devices and/or UPnP devices are required to implement additional translation protocols such as Remote UI or IP-over-1394. This means, unfortunately, that conventional IEEE 1394 devices and UPnP devices that do not implement translation protocols cannot communicate with each other. Accordingly, the present invention critically recognizes a need to enable a device that communicates only in UPnP to exchange data with a device that communicates only in IEEE 1394.

SUMMARY OF THE INVENTION

The present invention provides interoperability between IEEE 1394 network devices and universal plug-and-play (UPnP) network devices in a home network. A proxy has interfaces both to IEEE 1394 network devices and to UPnP network devices. The proxy discovers connected IEEE 1394 devices and converts information from these devices to UPnP syntax, such that UPnP devices connected to the proxy can discover IEEE 1394 devices as UPnP devices. Similarly, device information of UPnP device(s) is converted to IEEE 1394 syntax by the proxy such that an IEEE 1394 device recognizes a UPnP device such as a Media Server as either an IEEE 1394 device, a SUBUNIT, or as content that is available in the proxy. The proxy converts IEEE 1394 AV/C commands to/from equivalent services or actions in UPnP syntax and routes the commands to the appropriate destination. Also, isochronous streams in IEEE 1394 network format are transformed from/to IP-based streaming such as HTTP and/or RTP streaming, so that they can be recognized by UPnP devices.

Accordingly, a home entertainment system has at least one UPnP device providing information in UPnP format, at least one IEEE 1394 device providing information in IEEE 1394 format, and a proxy communicating with both devices and converting information in UPnP format from the UPnP device to IEEE 1394 format so that the IEEE 1394 device can access the information which was originally in UPnP format. The proxy also converts information in IEEE 1394 format from the IEEE 1394 device to UPnP format so that the UPnP device can access the information which was originally in IEEE 1394 format.

In some implementations the proxy discovers connected IEEE 1394 devices and converts the information to UPnP syntax, such that UPnP devices connected to the proxy discover the IEEE 1394 devices as UPnP devices embedded to the proxy or as content served by the proxy. Device information of UPnP devices is converted to IEEE 1394 syntax by the proxy such that an IEEE 1394 device recognizes a UPnP device as either of an IEEE 1394 device, a SUBUNIT, or content available in the proxy. The proxy can also convert IEEE 1394 AV/C commands to and from equivalent services or actions in UPnP syntax.

In non-limiting embodiments isochronous streams used in IEEE 1394 protocol are transformed from/to IP-based streaming by the proxy. The IP-based streaming may be HTTP or RTP.

In the non-limiting implementations discussed further below, content in IEEE 1394 devices can be represented by containers in a single notional Media Server. The content can be categorized by network topology and/or by type or genre. UPnP devices may be represented by the proxy to the IEEE 1394 device as subunits in a single unit of the proxy, or as Tuner S/U or Tape S/U, or as if all content belongs to a single device with flat content structure.

In another aspect, a home network has an IEEE 1394 network, a UPnP network, and a proxy interfacing between the networks to facilitate data transfer between the networks such that no device in the IEEE 1394 network or the UPnP network need implement translation protocols.

In still another aspect, a home network has an IEEE 1394 network, a UPnP network, and means for transferring data between the networks such that no device in the IEEE 1394 network or the UPnP network need implement translation protocols.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

With the present invention, IEEE 1394-only devices may browse content in a UPnP-only device and retrieve the content, and vice-versa, without requiring either device to implement translation protocols such as "RemoteUI" or IP-over-1394.

To commence, IEEE 1394 and UPnP protocols are first explained in terms of the four basic functions, i.e. 1) device and service discovery, 2) content presentation, 3) device control, and 4) data streaming. The way the two protocols are bridged are then described with detailed non-limiting examples.

Figure 1:
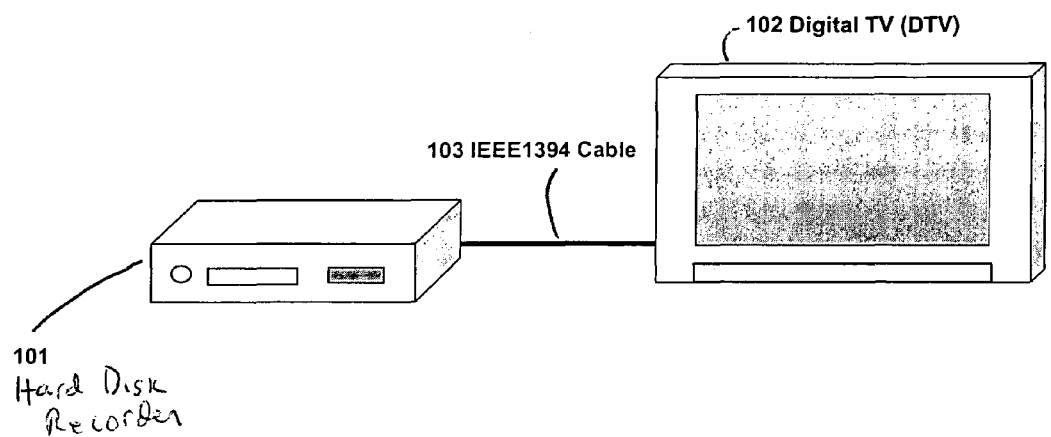
FIG. 1 is a block diagram of a simplified IEEE 1394 network.

Referring initially to FIG. 1, a simplified IEEE 1394 network is shown. A Hard Disc Recorder (HDR) 101 is connected to a Digital TV (DTV) 102 via an IEEE 1394 cable 103, it being understood that more IEEE 1394 devices can be included. A broadcast program that the DTV 102 receives can be transmitted over the IEEE 1394 cable 103 to be stored on the HDR 101. Upon receiving a playback signal, the content is sent back to the DTV 102 for play. The HDR 101 may also send a broadcast program that its embedded tuner receives.

To control various A/V devices over IEEE 1394, each device usually implements one or more protocol sets called "AV/C SUBUNIT" (S/U) in addition to basic protocols such as IEEE 1394, IEC61883, etc. Several types of S/U messages are defined based on the type and functionality. In the case of FIG. 1, the HDR 101 may implement Disc S/U (target) for the recorder function as well as TUNER S/U (target) for the tuner function, and the DTV 102 may implement MONITOR S/U and TUNER S/U (controller). The DTV 102 can also implement Disc S/U (controller) to control the HDR's Disc S/U (target).

Although the IEEE 1394 discovery process is not explicitly defined, a device typically accesses to the configuration ROM (ConfigROM) of a target device as defined in IEEE 1394 to obtain its basic attributes. A UNIT INFO command is sent to identify if the device supports AV/C S/U. Further information is obtained by issuing a S/U INFO command and by reading S/U dependent descriptors.

Content in a source device may be exposed to a sink or controller device using the descriptor mechanism. The detail format and usage of the descriptor (AV/C object list/entry descriptor, hereafter referred as to content descriptor) are specified in each on AV/C S/U, when applicable.

Each S/U specification defines a set of commands to control functions specific to the S/U. For example, Disc S/U defines hard disc recorder/player specific commands such as PLAY, STOP, RECORD, etc, and TUNER S/U specifies commands such as TUNE, etc. For example, the DTV may send a PLAY command of Disc S/U to start playing in the HDR.

The A/V content is usually transferred in IEEE 1394 protocol using the isochronous transmission mode defined in IEEE 1394. This mode ensures real time data transfer with guaranteed bandwidth. To send a stream from a source device to a sink device, the two devices first establish a logical point-to-point connection as a data path. This protocol is defined in IEC61883, which also defines data formats.

Figure 2:
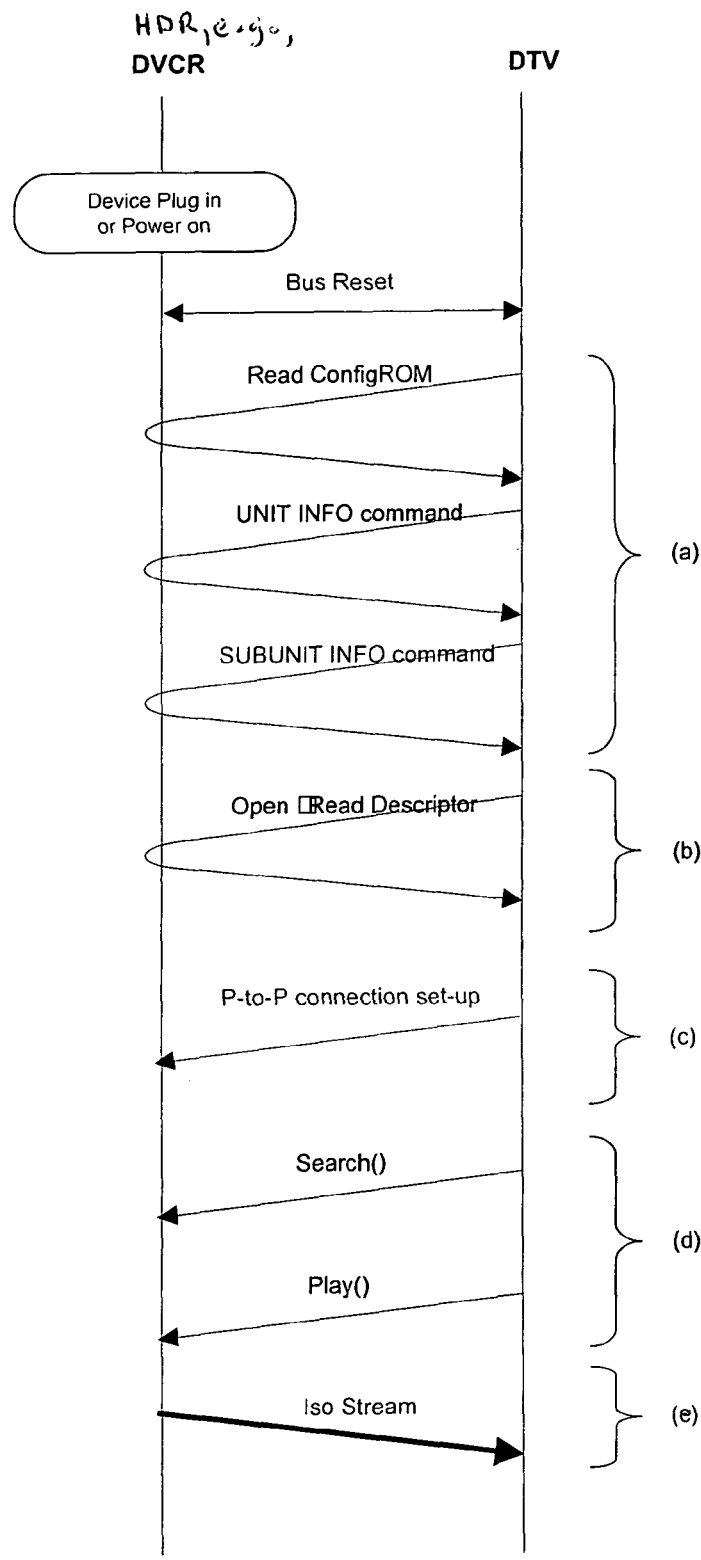
FIG. 2 illustrates the IEEE 1394 protocol followed by the devices in FIG. 1.

FIG. 2 shows an example of the interaction between the HDR 101 and the DTV 102 to start playing content stored in the HDR 101. In section (a) of the communication sequence, a bus reset is executed, which triggers device discovery. As described above, the DTV 102 reads the ConfigROM of the HDR 101 to obtain basic information of the HDR, and then sends UNIT INFO and SUBUNIT INFO commands to identify the type of AV/C S/U. In the ensuing section (b) of the sequence, a list of content in the HDR 101 is obtained by the DTV 102 by reading the content descriptor. Next, in section (c) of the sequence, before starting the stream the DTV 102 establishes a point-to-point connection with the HDR 101. This may be executed when the HDR 101 is selected by a user as a source device on the DTV's GUI. In section (d), the DTV 102 sends Disc SUBUNIT commands, for example, a SEARCH command, to locate a content and a PLAY command to start playing content from the HDR 101. The process concludes in section (e), wherein the content is sent from the HDR 101 to the DTV 102 in isochronous transmission mode.

Figure 3:
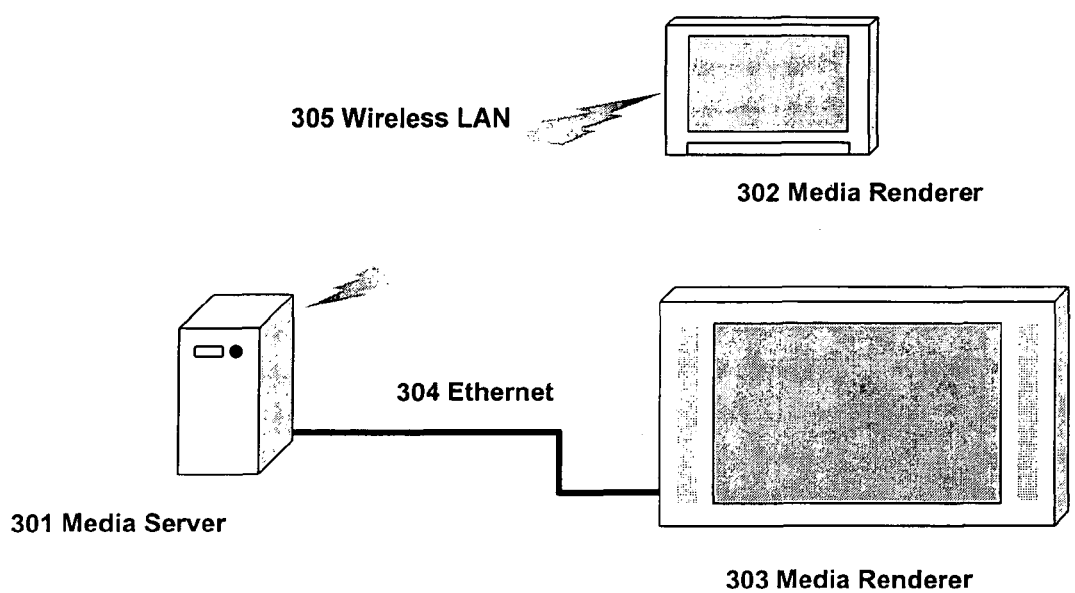
FIG. 3 is a block diagram of a simplified UPnP network.

With the above brief explanation of IEEE 1394 communication in mind, attention is now directed to FIG. 3, which illustrates an example of an Internet Protocol-based UPnP network system. In IP argot, a device 301 can be a Media Server (MS) and devices 302 and 303 can be Media Renderers (MRs). The MS 301 stores content and serves it to MRs to play.

The UPnP architecture is built on IP and physical connection is common with those used in PC networks. In the example of FIG. 3, the MR 302 and 303 are connected to the MS 301 via an ethernet 304 and a wireless LAN 305, respectively. To implement functionalities required in an AV CE network, UPnP uses several protocols on top of IP. These protocols include Simple Service Discovery Protocol (SSDP), Simple Object Access Protocol (SOAP), General Event Notification Architecture (GENA), etc.

In some implementations of UPnP A/V, MS and MR are controlled by a third logical entity called Control Point (CP). In many practical cases the CP is integrated to either of the MS or MR, and the following example assumes that the CP is integrated into one of the MR 302, 303.

When a UPnP device is added to a UPnP network, the device broadcasts messages to CPs to advertise its presence using SSDP ("ssdp:alive"). Alternatively, when a CP is added, it sends a "ssdp:search" message to search other devices. A "ssdp:alive" or a response to "ssdp:search" includes a uniform resource locater (URL) to the device description document which includes detailed information of the device and a URL of the service description document. The CP obtains these documents using a HTTP:GET request.

The Content Directory Service (CDS) allows a CP to enumerate content that a MS 301 can provide data to the network.

The primary action of this service is "Browse( )". This action allows a CP to obtain detailed information about each content item that the MS 301 can provide. In contrast, device control is provided as follows. The CP controls a device by sending a request message to the service, which is discovered in the device and service discovery process. SOAP is used for this messaging. Several types of services are defined for AV CE devices. For example, AVTransport service (AVT) may be used to control the flow of the associated content. When a CP is integrated with a media renderer 302, 303, however, streaming is typically controlled by streaming protocols rather than AVT. Protocols for streaming, however, are beyond the scope of UPnP itself. HTTP or RTP streaming is typically used. The implementation guidelines by DLNA covers the specification of streaming protocols and format. The implementation guidelines for streaming interoperability is provided by DLNA.

Figure 4:
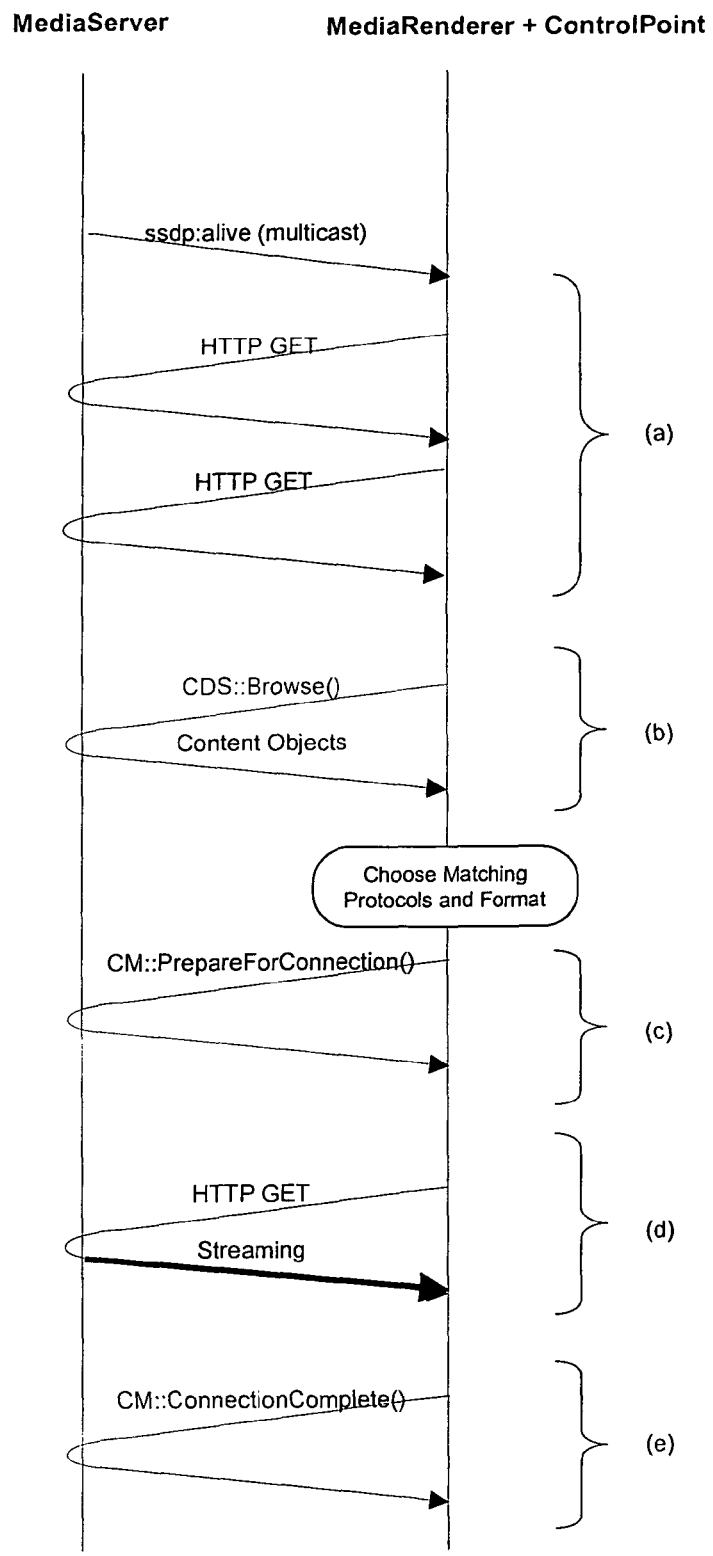
FIG. 4 illustrates the UPnP protocol followed by the devices in FIG. 3.

FIG. 4 illustrates the communication sequence between the MS 301 and either MR 302, 303 with embedded CP. In section (a), when a new MS becomes active in the network, it multicasts a "ssdp::alive" message to other devices to inform them of the presence of the new MS. The MRs then obtain the detailed information of the MS device and its service(s) by issuing "HTTP GET" requests. Then in section (b) of the sequence the MR 302, 303 sends a "CDS::Browse( )" or a "CDS::Search( )" message to the MS 301 to browse or search content to play. In section (c), a "CM::PrepareForConnection( )" message is optional, but if implemented, this action gives the MS 301 an opportunity to prepare itself for a Upcoming transfer. Proceeding to section (d), in the case of HTTP streaming, a GET command is invoked to start the streaming, and in section (e) a "CM::Connection Complete( )" message is used to terminate and release the connection.

Figure 5:
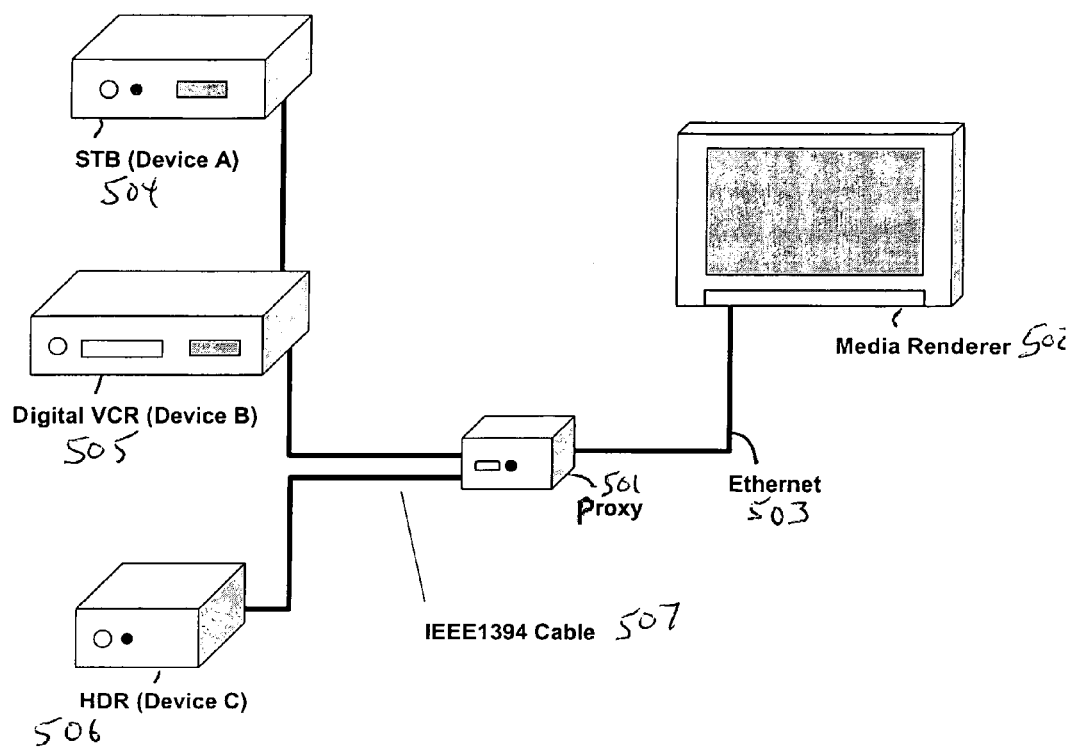
FIG. 5 is a block diagram of a first preferred combined IEEE 1394/UPnP network, used to explain FIGS. 6-10 in making data in IEEE 1394 devices available to UPnP devices on the network.

Now referring to FIG. 5, which shows a first non-limiting implementation of the present system, a proxy is provided and has interfaces both to IEEE 1394 network components and to UPnP network components. It is to be understood that while FIG. 5 shows that the proxy may be a separate component in the system, the proxy is not necessarily a separate box, but could be implemented by a software module or component embedded in other CE devices, or in a PC.

Regardless of how physically implemented, in accordance with principles set forth more fully below the proxy discovers connected IEEE 1394 devices in accordance with IEEE 1394 principles discussed above and converts information from such devices to UPnP syntax, such that UPnP devices connected to the proxy discover the IEEE 1394 devices as UPnP devices embedded to the proxy or as content served by the proxy. Similarly, device information of UPnP device(s) is converted to the IEEE 1394 syntax by the proxy such that an IEEE 1394 device recognizes a UPnP Media Server as either of an IEEE 1394 device, a SUBUNIT, or as content available in the proxy. The proxy converts an IEEE 1394 AV/C command to/from XML documents for an equivalent service or action in UPnP syntax and routes the messages to the appropriate destination. Isochronous streams in IEEE 1394 protocol are transformed from/to IP-based streaming such as HTTP and/or RTP streaming for use by UPnP devices.

As one non-limiting system used to describe how IEEE 1394 device data is rendered into UPnP data, FIG. 5 is shown. Content in an IEEE 1394 device is transferred to a UPnP device through a proxy 501, which has an IEEE 1394 interface to IEEE 1394 devices as well as a UPnP interface such as an Ethernet interface for UPnP devices. A UPnP MediaRenderer (MR) 502 can be connected via an Ethernet cable 503 to the UPnP interface of the proxy 501. The MR 502 may also implement a Control Point (CP) of UPnP in accordance with principles discussed above. The proxy 501 and the MR 502 support HTTP streaming for content transfer.

On the other hand, devices 504, 505, and 506 are IEEE 1394 devices that are connected to the IEEE 1394 interface of the proxy 501 via IEEE 1394 cables 507. In non-limiting implementations each of these IEEE 1394 devices 504, 505, 506 may have the following functions respectively. Device 504 may be a STB that receives broadcast programs and implements TUNER S/U (Target), device 505 may be a Digital VCR with embedded tuner that implements TUNER S/U (Target) and TAPE S/U (Target), and device 506 may be a HDR which implements Disc S/U (Target) with content descriptor.

Figure 6:
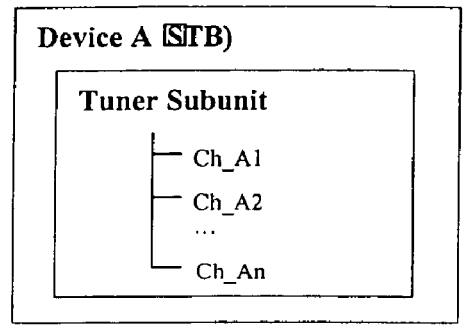
FIG. 6 illustrates logical structures used by the devices in FIG. 5.
Figure 6:
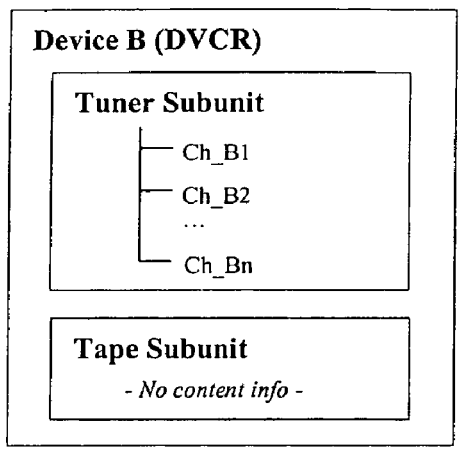
Figure 6:
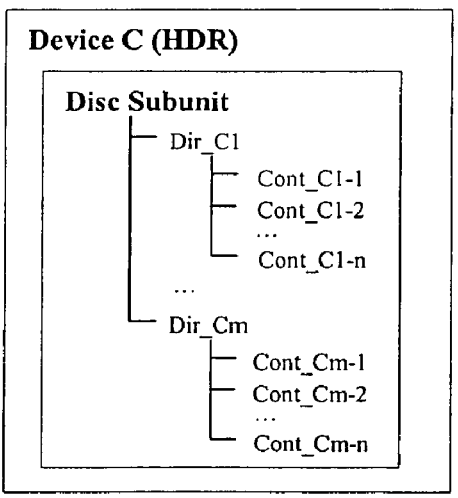

With the exemplary non-limiting system of FIG. 5 in mind, attention is now directed to FIG. 6, which shows content structure in various devices. As shown in FIG. 6, the set top box has a channel selection from "Ch_A1" to "Ch_Am", which are enumerated in the content descriptor in a way defined in the TUNER S/U specification. The HDR may have a channel selection logical structure for the tuner in a similar fashion, but the proxy 501 cannot retrieve the content information in a tape cassette, since no content descriptor is supported. On the other hand, the HDR supports the content descriptor in Disc S/U and exposes the list. In this example, the content list has a hierarchical structure. For example, as shown the directory "Dir_C1" contains content "Cont_C1-1" to "Cont_C1-n".

Figure 7:
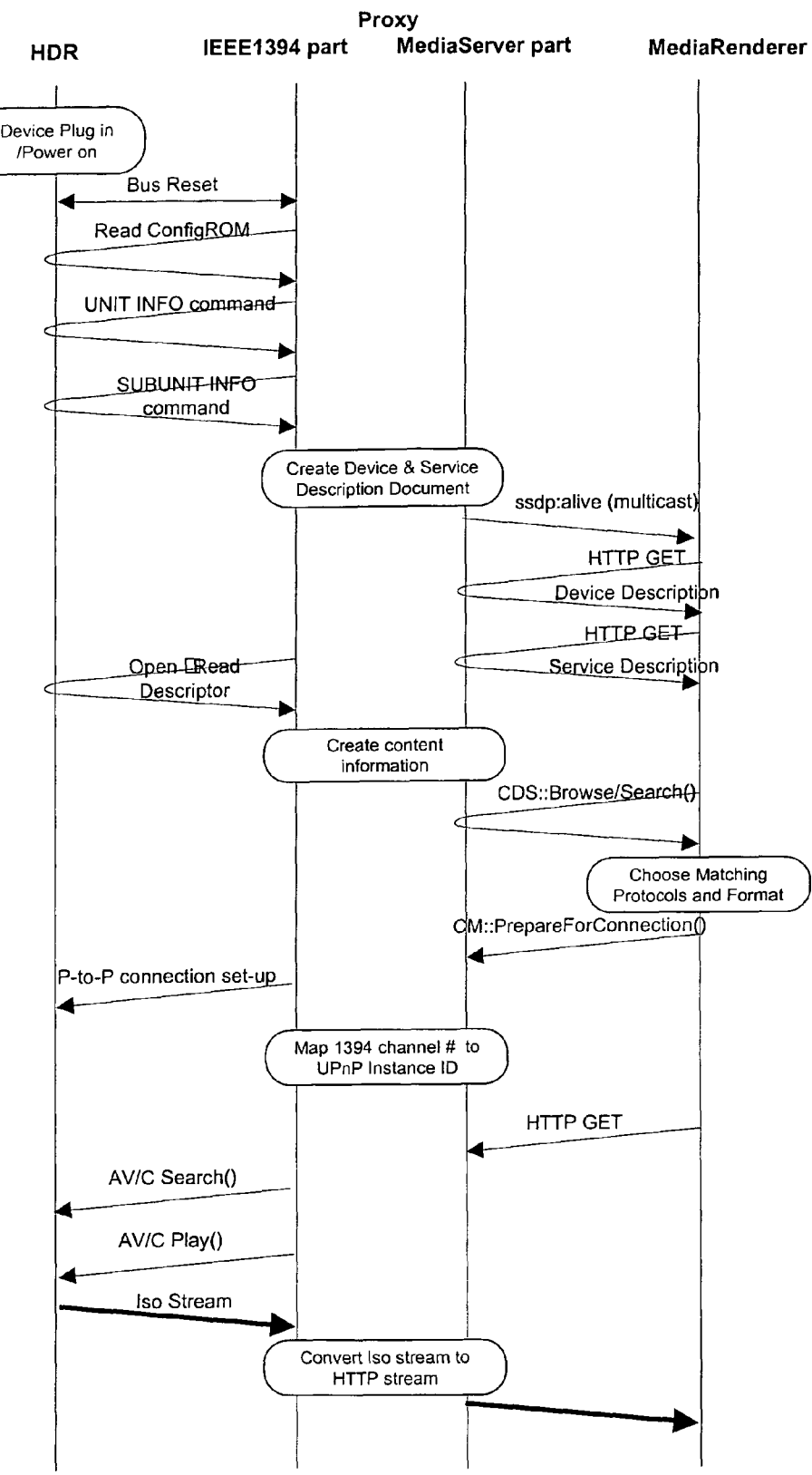
FIG. 7 illustrates the communication flow between the proxy and the other devices shown in FIG. 5.

FIG. 7 shows how the proxy 501 converts IEEE 1394 syntax to UPnP syntax. When a bus reset initially occurs at connection or disconnection of an IEEE 1394 device, the proxy 501 enumerates the IEEE 1394 bus and detects that a new device added to the bus. The proxy discovers the type and capability of the new device as set forth above in accordance with IEEE 1394 principles and as repeated for convenience in FIG. 7, which results in the creation of a device and service description document, preferably in XML, at the proxy 501 as shown. Next, as also shown in FIG. 7, the proxy 501 sends a "ssdp:alive" message to the MR 502. For the removal of an existing device, the proxy 501 simply sends a "ssdp:byebye" message to the MR 502.

Departing momentarily from the description of FIG. 7, the proxy 501 reads the content descriptor of the IEEE 1394 devices and parses the list of content. A URL is generated for each piece of content and for the content directory, which is returned to the MR 502 when a "ContentDirectory:Browse" is invoked by the MR 502.

With respect to device control, when AVT is supported, an action is converted to the corresponding AV/C command. For example, when the MR 502 invokes "AVTransport:Play", the proxy 501 sends an AV/C PLAY command to the relevant IEEE 1394 device. In many cases, streaming is controlled by the streaming protocol rather than using AVT. In that case, the proxy 501 chooses and sends the corresponding AV/C command(s) which gives the same or similar action. For example, when the MR 502 issues a "HTTP GET" command to start the streaming, the proxy 501 issues an AV/C PLAY command to start an IEEE 1394 isochronous transaction.

With further respect to streaming, the proxy 501 has two sets of data transmissions to handle. For example, isochronous transmission on the IEEE 1394 side is associated to HTTP streaming on the UPnP side. When the proxy 501 receives isochronous packets from an IEEE 1394 source device, the IEEE 1394 specific header such as the source packet header is first removed and then queued in a ring buffer. A HTTP or RTP streaming application in the proxy 501 reads the ring buffer and constructs HTTP or RTP streaming packets to send to the MR 502. If the content is an MPEG Transport Stream (TS), the proxy 501 may transcode it to MPEG Program Stream (PS) depends on the format the MediaRenderer 502 supports.

Returning to FIG. 7, after creating an XML document for the new IEEE 1394 device and service description, the proxy 501 sends "sspd:alive" messages to advertise the IEEE 1394 presence and services. The MR 502 accesses the XML documents using HTTP GET requests as shown. In essence, a proxy in the proxy 501 opens to read the content descriptors of the IEEE 1394 device (e.g., a HDR) and to construct a content directory as shown. This information is provided to the MR 502 when requested by "CDS:Browse" or "CDS: Search" messages, in accordance with FIG. 7.

Before the MR 502 plays content, it may send a "CM: PrepareForConnection" message as indicated in FIG. 7. The proxy 501 then establishes a point-to-point connection to the HDR. To start streaming, the MR 502 sends a final HTTP GET request to the proxy 501 as shown, designating the URI of the desired content in the IEEE 1394 device. The proxy 501 in response sends an AV/C SEARCH command to the relevant IEEE 1394 device designating the start point of the content designated by the URI and then sends an AV/C PLAY command to the IEEE 1394 device, as also illustrated near the bottom of FIG. 7. An isochronous stream from the IEEE 1394 device (e.g., a HDR) is converted to HTTP streaming at the proxy 501 as shown, and delivered to the MR 502.

Figure 8:
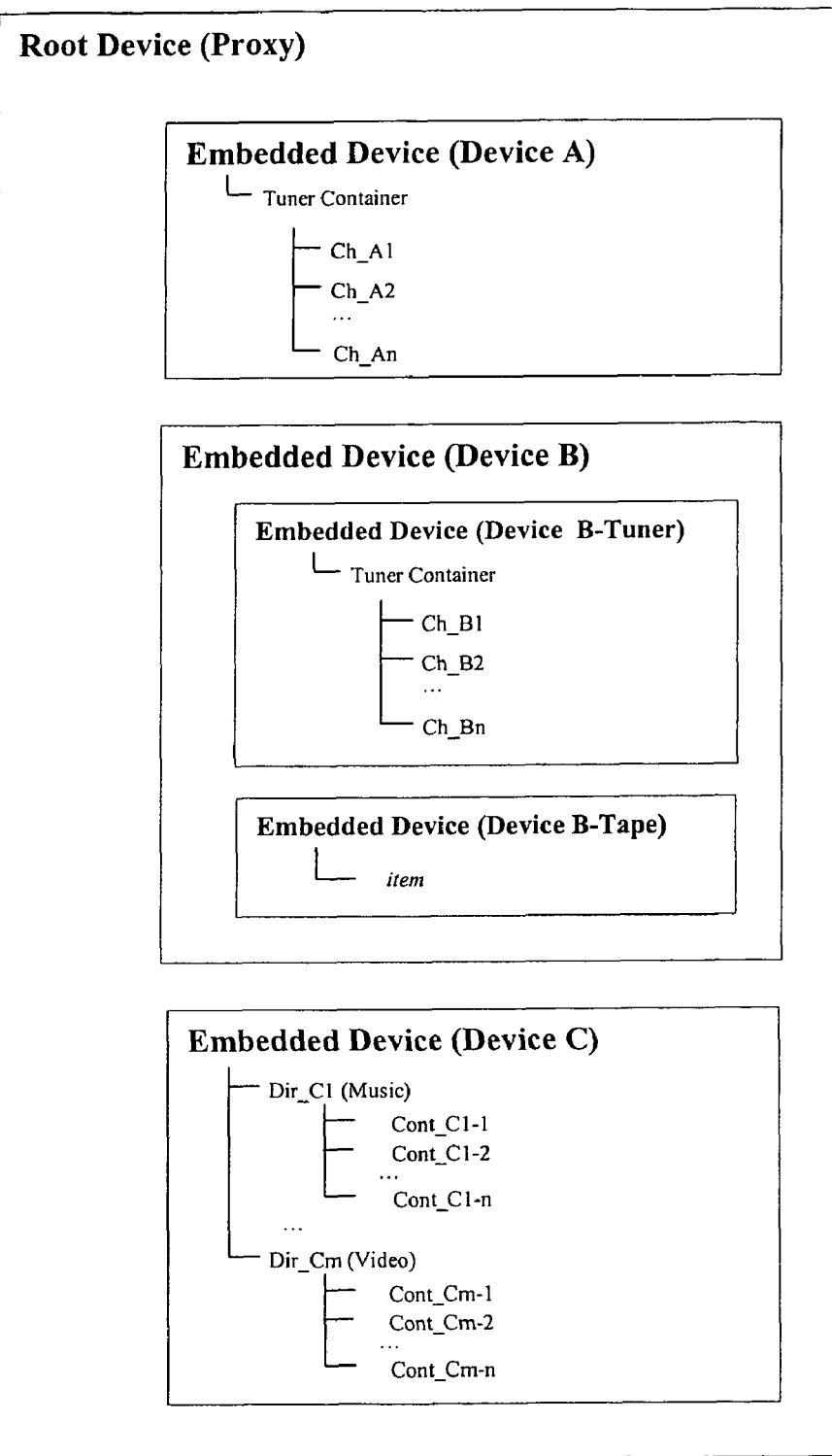
FIGS. 8-10 illustrate additional logical structures related to the network of FIG. 5.

Details of presenting IEEE 1394 devices and their content to a UPnP CP will now be explained. FIG. 8 illustrates a first example logical structure for presenting IEEE 1394 devices and their content to a UPnP network. In the device discovery process, the MR 502 discovers the proxy 501 as a root device of a notional Media Server (MS), and each IEEE 1394 device as an embedded device of the notional root MS. For each IEEE 1394 device presented thus, all the AV/C SUBUNITs implemented in that device are presented as an embedded device hierarchically.

A UI in the MR 502 is implemented in such a way that a user first selects the proxy device 501 as a root device and then selects an embedded device. When an embedded device (designated "Device A" in FIG. 8, essentially a surrogate for the corresponding IEEE 1394 device) is selected, for example, the MR 502 accesses available channel information by CDS. The content is presented as items in a tuner container to indicate they are programs served by the tuner.

FIG. 8 shows a second example surrogate IEEE 1394 device (B) that has two sub-embedded devices, owing to the fact that in the example the original IEEE 1394 device (B) has two SUBUNITs. Content from the TUNER S/U is presented in the similar manner as the embedded device (A) mentioned above. TAPE S/U is represented by the embedded "Device B-tuner". When selected, the embedded "Device B-Tuner" does not provide further content information since content descriptors are not supported in the original IEEE 1394 device 505, which, it will be recalled, was assumed to include a tape drive. The device (D), on the other hand, supports content descriptors in the Disc S/U. When selected, its hierarchical content structure is presented in CDS format.

Figure 9:
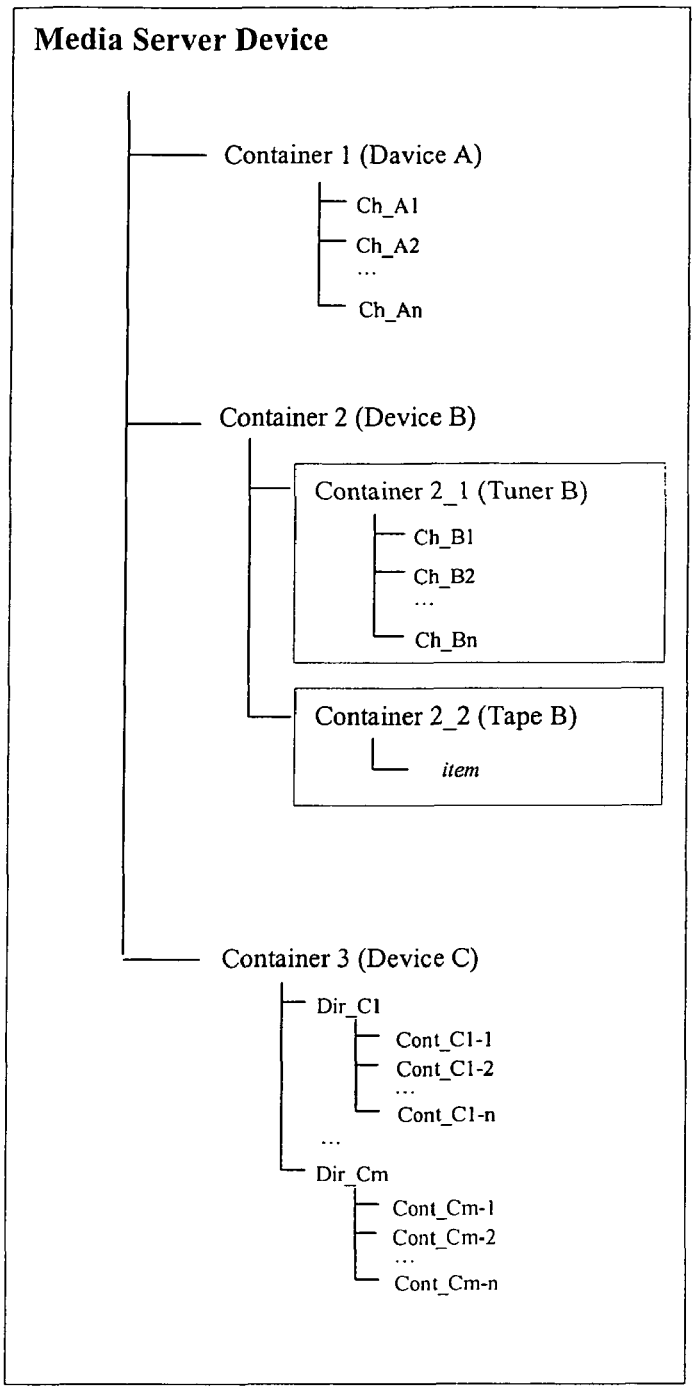

FIG. 9 shows an alternate implementation, recognizing that some MediaRenderers may not support the hierarchal embedded device structure of FIG. 8. As shown in FIG. 9, all IEEE 1394 devices can be presented by the proxy 501 to the MR 502 as a single notional Media Server. In this implementation, content in the IEEE 1394 devices (A), (B), and (C) is presented as content under the notional MS. When the proxy 501 is requested to provide the content information, it first presents plural containers, each of which represents a respective IEEE 1394 device. A container has a sub-structure of contents as shown. For example, container 2, representing IEEE 1394 device B, has sub-containers "Container 2_1 (Tuner B)" and "Container 2_2 (Tape B)". The proxy 501 may name each container pertinently so that a user can easily recognize the corresponding IEEE 1394 device on the GUI of the MR.

Figure 10:
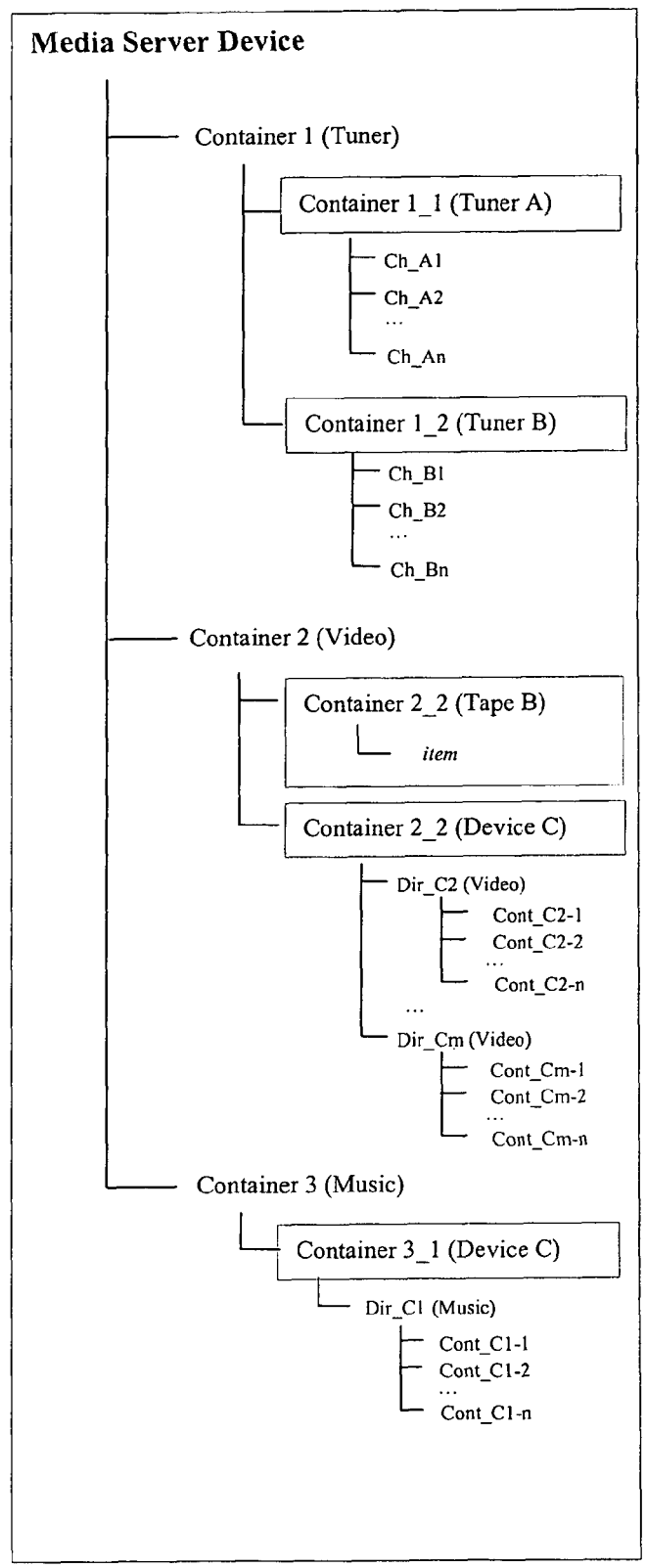

FIG. 10 shows another implementation similar to FIG. 9 in which the content in IEEE 1394 devices is represented by containers in a single notional Media Server, except that in FIG. 10 the content is categorized by type or genre rather than by the physical topology of the network. As shown in FIG. 10, the notional Media Server has three containers, e.g., tuner, video, and music. "Container 1 (Tuner)" contains the broadcast content from the tuners. Since two tuners exist in the corresponding IEEE 1394 device, the "Container 1 (Tuner)" may have two sub-containers. The content stored in those storage devices, DVCR 505 and HDR 506, is sorted by genre such as video or music, and associated to corresponding containers. The proxy 501 may choose the categories appropriately so as to maximize users accessibility to the content.

Figure 11:
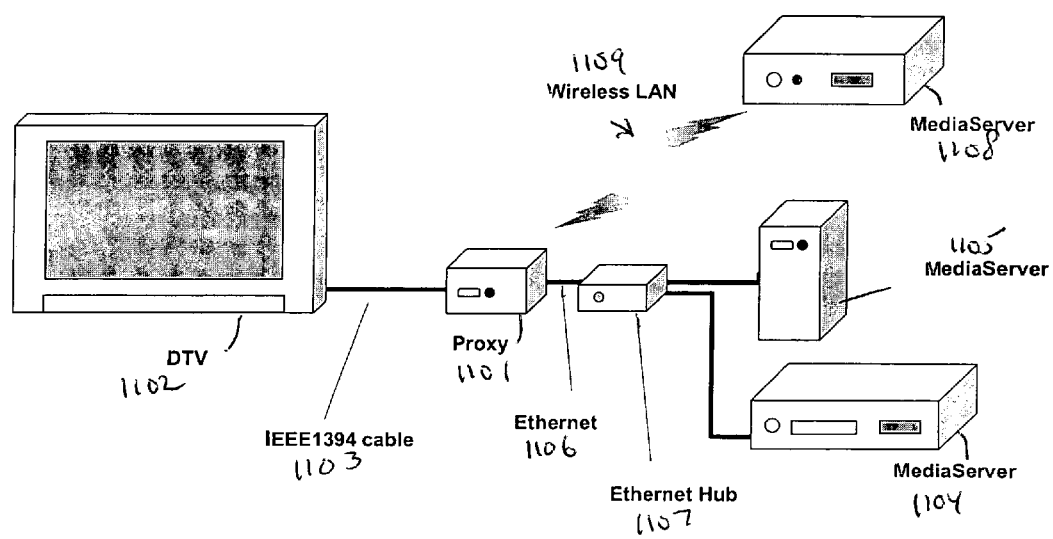
FIG. 11 is a block diagram of a second preferred combined IEEE 1394/UPnP network, used to explain FIGS. 12-17 in making data in UPnP devices available to IEEE 1394 devices on the network.

Now turning to FIG. 11 for an alternate home network that is useful for describing data transfer from a UPnP device to and IEEE 1394 device, content in a UPnP device (any one of the components 1104, 1105, 1108) is transferred to an IEEE 1394 device 1102 through a proxy device 1101, which can have an IEEE 1394 interface as well as Ethernet and Wireless LAN interfaces for UPnP devices. The IEEE device 1102 may be a DTV that is connected to the proxy 1101 through an IEEE 1394 cable 1103.

UPnP MediaServers (which, in the context of playing content on the IEEE 1394 device 1102, can be regarded as Media Servers) 1104 ("MR-A") and 1105 ("MR-B") can be connected to the proxy 1101 via an Ethernet Hub 1107, while a wireless Media Server 1108 ("MR-C") can be connected to the proxy 1101 through a wireless LAN 1109. In the non-limiting implementations shown the MRs have the following functions respectively. MR-A 1104 is a tuner that receives broadcast programs and MR-B 1105 is a combination device of tuner and hard disc recorder. MR-C 1108 has an internal hard disc to record content but no built-in tuner.

Figure 12:
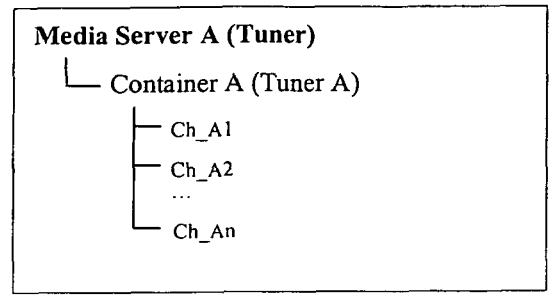
FIG. 12 illustrates logical structures used by the devices in FIG. 11.
Figure 12:
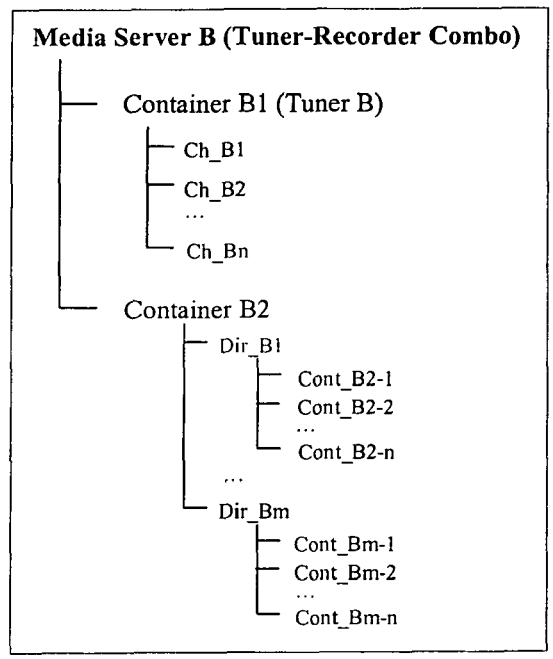
Figure 12:
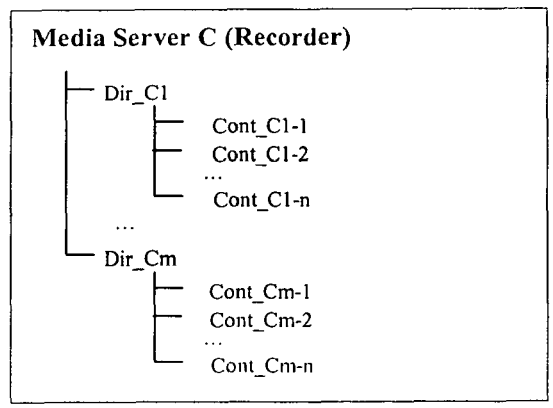

Content provided by these MRs is shown in FIG. 12. For example, MR-B has two containers, that is a container B1 for tuner content and a container B2 for content stored in the hard disc drive. The latter has hierarchical structure as shown, with a "Dir_B1", for example, which has content items "Cont_B2_1" to "Cont_B2_1".

The way the proxy 1101 converts UPnP syntax to IEEE 1394 syntax is as follows. The proxy 1101 enumerates available MS through a UPnP device and service discovery process. Based on the information obtained, the proxy 1101 may determine the "UNIT_TYPE" to present MS's to the IEEE 1394 network (alternatively, the "UNIT_TYPE" may be predetermined). If the "UNIT_TYPE" is dynamically determined, the proxy causes a bus reset to give devices on IEEE network a trigger to refresh the device information. The IEEE 1394 component (e.g., a DTV) then goes through a device discovery process in accordance with IEEE 1394 principles. The proxy 1101 is single node on the IEEE 1394 network and all of the MS's and their content are presented as one or more AV/C Subunits and their content.

With respect to content presentation, the proxy enumerates content in the MS's using a "CDS:Browse( )" function. The information is converted to a content descriptor in the format defined in the AV/C specification. How to construct the content descriptor also relates to the presentation of the MS(s), and will be detailed in the later examples. With respect to device control, when AVT is supported an AV/C command from an IEEE 1394 device is converted to the corresponding AVT action. For example, an AV/C PLAY command issued by a DTV is converted to "AVTransport:Play" by the proxy 1101. In some cases, streaming may be controlled by the streaming protocol rather than by AVT, in which case the proxy 1101 sends the corresponding command that gives the equivalent or most similar action. For example, when the MR receives an AV/C PLAY command, it may send a "HTTP GET" command to start the streaming in the case of HTTP streaming.

With respect to streaming, when the proxy 1101 receives HTTP streaming, the streaming data is first placed in a buffer memory. The proxy 1101 packetizes the data in the appropriate packet size. The packet headers such as source packet headers are also attached as defined in IEC61883. If the content provided by a MediaServer is an MPEG Program Stream, the proxy may transcode it to an MPEG transport stream.

Figure 13:
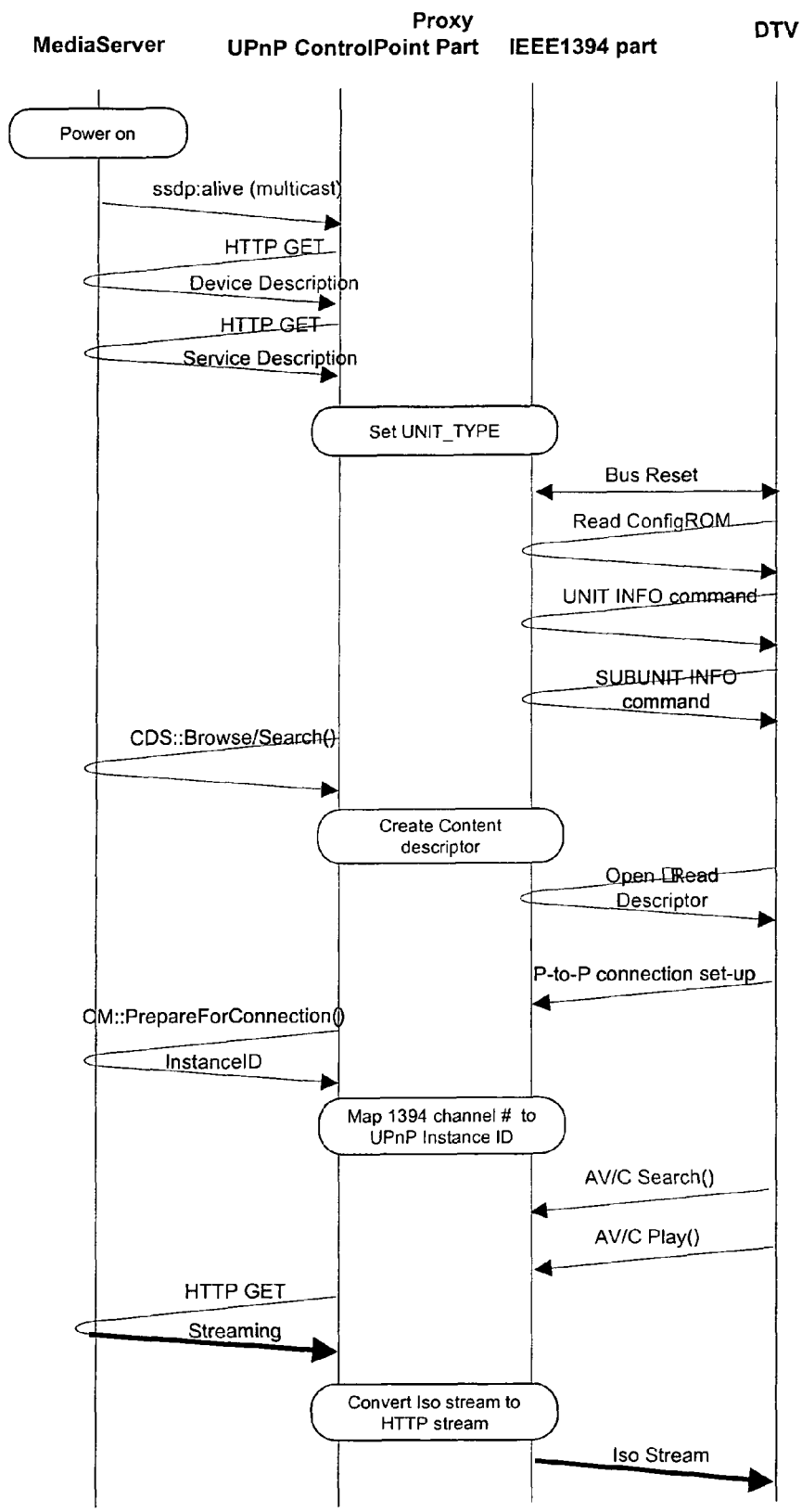
FIG. 13 illustrates the communication flow between the proxy and the other devices shown in FIG. 11.

FIG. 13 shows an example communication sequence between one of the MS (UPnP) devices and the DTV (IEEE 1394 device) through the proxy 1101. When the MS is powered on, it multicasts a "ssdp:alive" message on the network. The CP function part of the proxy 1101 then starts correcting its device and service information by means of a HTTP GET request. Based on the information, the proxy 1101 may determine the "UNIT_TYPE" to present to the IEEE 1394 network. If the "UNIT_TYPE" is dynamically determined, the proxy causes a bus reset to give devices on IEEE network a trigger to refresh the device information. The DTV then goes through the device discovery process as explained before. The proxy 1101 enumerates content in the MS by means of a "CDS::Browse( )" command, converting the list to the descriptor to be presented to the DTV. When the DTV selects the MR as a source device, it establishes a Point-to-Point connection with the proxy. The proxy then sends a "CM: PrepareForConnection( )" message whose instance ID is associated with the P-to-P connection and is managed by the proxy. To play content, the DTV sends an AVC command such as a Search( ) to specify the content and Play( ). The proxy in response sends a HTTP GET request for the corresponding address to start the HTTP streaming.

Figure 14:
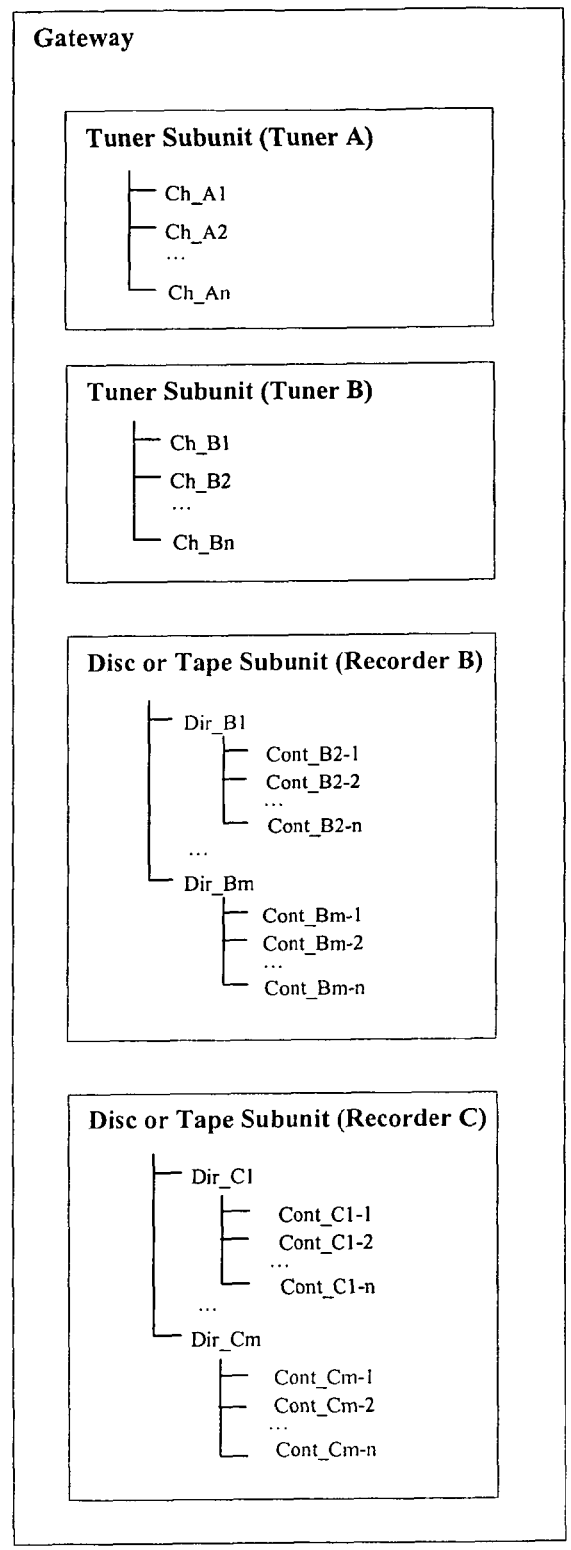
FIGS. 14-17 show additional logical structures related to the network of FIG. 11.

FIG. 14 shows an example of device and content presentation used by the proxy 1101. Because the capability of discovering and recognizing IEEE 1394 source devices differs from each sink device, the proxy 1101 may decide the best way to represent UPnP MSs and their content depends on the sink devices that are to be supported. The following are some examples.

In FIG. 14, all of the MediaServers are presented by the proxy 1101 to the IEEE 1394 component as subunits in a single unit of the proxy. The proxy 1101 determines subunit types depending on the function and/or types of content each MS provides. For example, the MS-A is represented as a Tuner S/U since it is a tuner. The MS-B has two functions, namely, of tuner and recorder, and consequently is represented as Tuner S/U and Tape S/U, respectively. The content in the recorder alternatively may be represented by a Disc S/U. Currently a Tape S/U is supported by a larger number of sink devices than Disc S/U, so the content is more widely enumerated by sink devices when presented as a Tape S/U. Disc S/U, on the other hand, may have a better fit to the functions provided by the MediaServer's recorder especially when the recorder is disc type. The proxy 1101 may decide depending on the IEEE 1394 device it expects to support.

Figure 15:
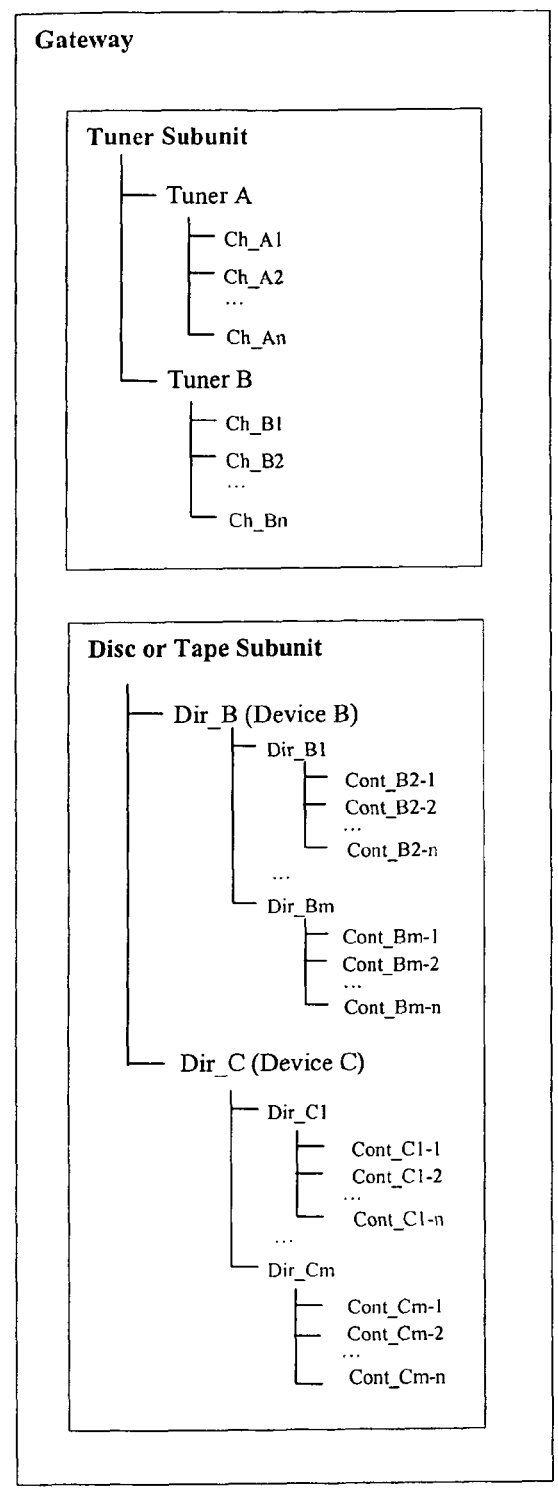

Some IEEE 1394 sink devices are not able to support multiple subunits of the same type. In this case, content is presented as one of Tuner S/U and Tape S/U as shown in FIG. 15. The TUNER S/U has two directories in the content descriptors for MS-A and MS-B. Similarly, the TAPE or Disc S/U has two directories for MS-B and MS-C.

Figure 16:
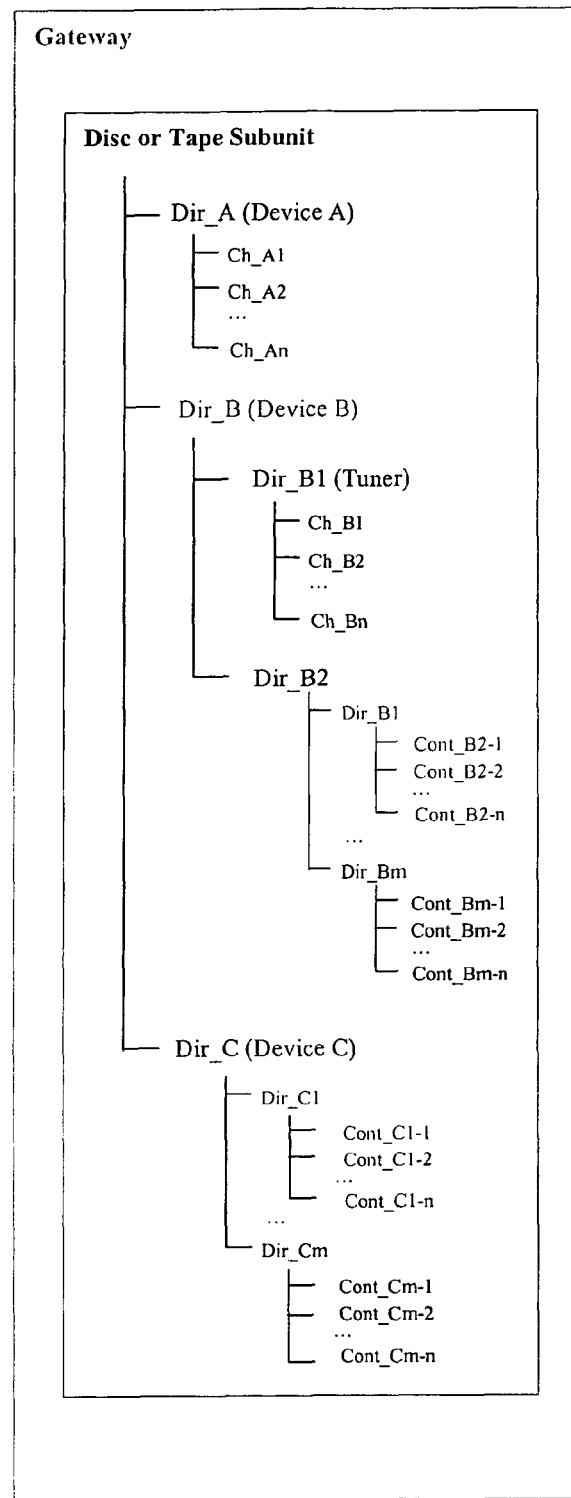

In other cases, an IEEE 1394 sink device may be able to recognize only one of the S/U for each Unit. The proxy 1101 accordingly may present one S/U if such a sink device is the main target. As shown in FIG. 16, the proxy 1101 can have a single TAPE or Disc S/U, and all of the content including Tuner belongs to the S/U. This presentation is an appreciative approach but could be recognized by a larger number of IEEE 1394 sink devices when they support TAPE or Disc S/U.

Figure 17:
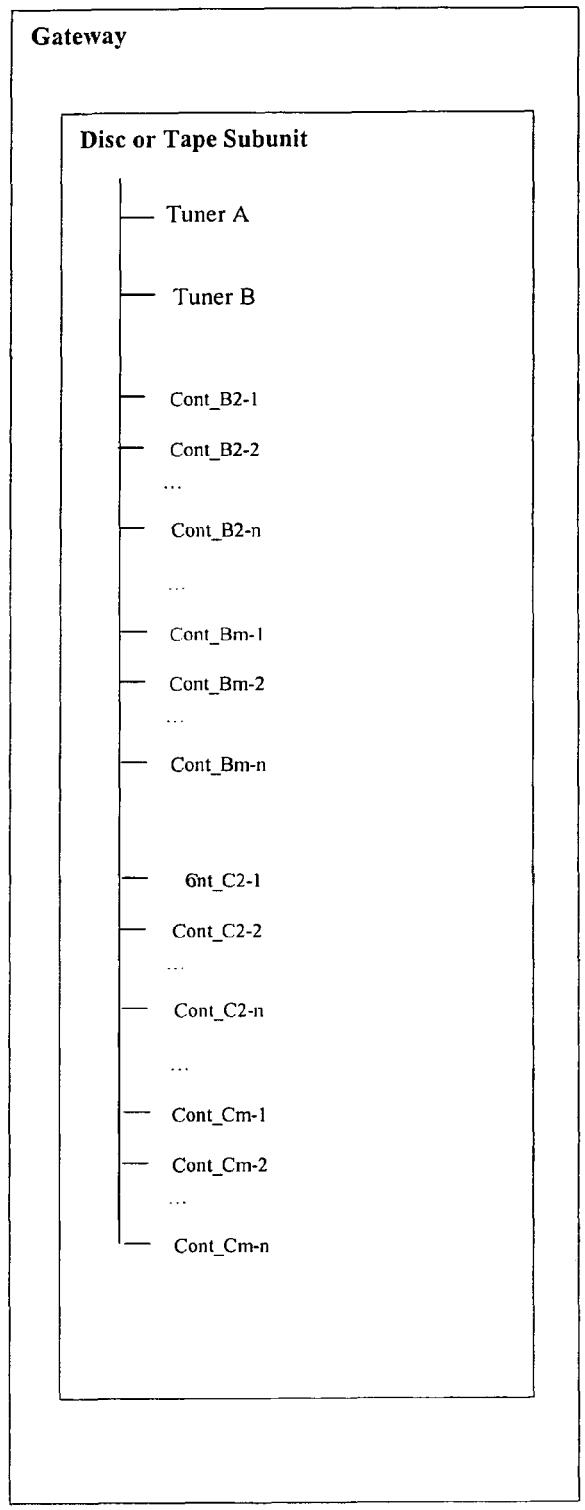

Furthermore, some sink devices may be able to discover only a single flat structure of content list. To be compatible with such a basic implementation, the proxy 1101 may present content as if all content belongs to a single device with flat content structure. To avoid user confusion, a limited part of the content may be listed in that case. For example, the content list may have a structure shown in FIG. 17. When the first content ( ) is selected, the proxy accesses the Tuner of the MS-A, and provides the currently tuned-to program without offering the function to select the program from the tuner. Such a simplification of the content list may be considered depending on the type and number of MS that the proxy supports.

It is to be understood that in the present system and method, the physical UPnP network is not limited to Ethernet or Wireless LAN, but applies to other UPnP networks as well, including, e.g., power line communication, coaxial cable communication, etc. Additionally, the streaming technology is not limited to HTTP streaming, but can include other streaming types such as RTP streaming.

While the particular SYSTEM AND METHOD FOR ACHIEVING INTEROPERABILITY IN HOME NETWORK WITH IEEE 1394 AND UPNP DEVICES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". Moreover, it is not necessary for a device or method to address each and every problem sought to be solved by the present invention, for it to be encompassed by the present claims. Furthermore, no element, device, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A system, comprising:
   at least one UPnP device providing information in UPnP format;
   at least one IEEE 1394 device providing information in IEEE 1394 format; and
   at least one proxy communicating with both devices and converting information in UPnP format from the UPnP device to IEEE 1394 format so that the IEEE 1394 device can access the information which was originally in UPnP format, the proxy also converting information in IEEE 1394 format from the IEEE 1394 device to UPnP format so that the UPnP device can access the information which was originally in IEEE 1394 format, wherein the proxy converts IEEE 1394 format to UPnP format at least in part by:
creating a respective XML document for each IEEE 1394 device;
sending a message to advertise the IEEE 1394 device presence and its services;
wherein the UPnP device accesses the XML documents from the proxy using HTTP GET requests, the proxy reading content descriptors therein and constructing a content directory;
providing the content descriptors to the UPnP device in response to a request;
in response to a final HTTP GET request from the UPnP device, designating to the IEEE 1394 device a start point of content designated by the UPnP device;
sending a PLAY command to the IEEE 1394 device;
receiving an isonchronous stream of the content from the IEEE 1394 device;
converting the stream to HTTP streaming; and
delivering the HTTP streaming to the UPnP device.

2. The system of claim 1, wherein the proxy discovers connected IEEE 1394 devices and converts the information in IEEE 1394 format to UPnP syntax, such that UPnP devices connected to the proxy discover the IEEE 1394 devices as UPnP devices embedded to the proxy or as content served by the proxy.

3. The system of claim 1, wherein the proxy converts IEEE 1394 AV/C commands to and from equivalent services or actions in UPnP syntax.

4. The system of claim 1, wherein the IP-based streaming is at least one of: HTTP or RTP.

5. The system of claim 1, wherein content in IEEE 1394 devices is represented by containers in a single notional Media Server, the content being categorized by network topology.

6. The system of claim 1, wherein content in IEEE 1394 devices is represented by containers in a single notional Media Server, the content being categorized by type or genre.

7. The system of claim 1, wherein UPnP devices are represented by the proxy to the IEEE 1394 device as subunits in a single unit of the proxy.

8. The system of claim 1, wherein UPnP content is represented by the proxy to the IEEE 1394 device as at least one of: Tuner S/U or Tape S/U.

9. The system of claim 1, wherein the proxy represents UPnP content to the IEEE 1394 device as if all content belongs to a single device with flat content structure.

10. A network, comprising:
an IEEE 1394 network;
a UPnP network;
a proxy interfacing between the networks to facilitate data transfer between the networks such that no device in the IEEE 1394 network or the UPnP network need implement translation protocols, wherein audio video content in IEEE 1394 devices on the IEEE 1394 network is represented by containers in a single notional Media Server, the content being categorized by network topology in that each container represents a respective IEEE 1394 device;
wherein the proxy discovers IEEE 1394 devices connected to the IEEE 1394 network and converts the information in IEEE 1394 format to UPnP syntax, such that UPnP devices in the UPnP network connected to the proxy discover the IEEE 1394 devices as UPnP devices embedded to the proxy or as content served by the proxy;
wherein device information of UPnP devices is converted to IEEE 1394 syntax by the proxy such that an IEEE 1394 device recognizes a UPnP device as either of an IEEE 1394 device, a SUBUNIT, or content available in the proxy;
wherein the proxy converts IEEE 1394 AV/C commands to and from equivalent services or actions in UPnP syntax; and
wherein isochronous streams used in IEEE 1394 protocol are transformed from to IP-based streaming by the proxy.

11. The network of claim 10, wherein the proxy converts information in UPnP format from the UPnP network to IEEE 1394 format so that the IEEE 1394 network can access the information which was originally in UPnP format, the proxy also converting information in IEEE 1394 format from the IEEE 1394 network to UPnP format so that the UPnP network can access the information which was originally in IEEE 1394 format.

12. The network of claim 10, wherein UPnP devices are represented by the proxy to the IEEE 1394 network as sub-units in a single unit of the proxy, and/or UPnP content is represented by the proxy to the IEEE 1394 network as at least one of: Tuner S/U or Tape S/U, and/or the proxy represents UPnP content to the IEEE 1394 network as if all content belongs to a single device with flat content structure.

13. A home network, comprising:
an IEEE 1394 network;
a UPnP network; and
a proxy transferring data between the networks such that no device in the IEEE 1394 network or the UPnP network need implement translation protocols, wherein
the proxy provides content from an UPnP device to an IEEE 1394 device at least in part by:
storing UPnP device and service information;
updating the device and service information using a HTTP GET request;
based on the device and service information, determining a "UNIT TYPE" to present to the IEEE 1394 device;
causing a bus reset to trigger the IEEE 1394 device to refresh device information therein;
enumerating content in the UPnP device using a browse command;
receiving a list of content from the UPnP device in response to the browse command;
converting the list to a descriptor to be presented to the IEEE 1394 device;
sending a prepare message to the IEEE 1394 device over a point-to-point connection therewith, the prepare message having an instance ID is associated with the connection;
receiving a request for content from the IEEE 1394 device;
in response to the request, sending a HTTP GET request to the UPnP device to start streaming the content.

* * * * *